United States Patent
Park et al.

(10) Patent No.: US 8,520,146 B2
(45) Date of Patent: Aug. 27, 2013

(54) DISPLAY APPARATUS PERFORMING CORRECTION OF DATA CORRUPTION AND METHOD THEREOF

(75) Inventors: Eun-kyung Park, Suwon-si (KR); Bong-geun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 12/539,405

(22) Filed: Aug. 11, 2009

(65) Prior Publication Data

US 2010/0123828 A1 May 20, 2010

(30) Foreign Application Priority Data

Nov. 18, 2008 (KR) .................. 10-2008-0114681

(51) Int. Cl.
*H04N 5/445* (2006.01)
(52) U.S. Cl.
USPC ........... 348/699; 348/565; 348/700; 348/739; 348/413.1; 348/571; 375/240.16

(58) Field of Classification Search
USPC .............. 348/571, 451, 452, 699, 700, 565, 348/739, 413.1, 416.1; 382/236; 375/240.16, 375/240.01
See application file for complete search history.

(56) References Cited

U.S. PATENT DOCUMENTS
2007/0200838 A1* 8/2007 Lee et al. ............... 345/204

FOREIGN PATENT DOCUMENTS
KR 2003-0049496 A 6/2003

* cited by examiner

*Primary Examiner* — Jefferey Harold
*Assistant Examiner* — Jean W Desir
(74) *Attorney, Agent, or Firm* — Sughrue Mion, PLLC

(57) ABSTRACT

A display method and display apparatus are provided. The display method includes receiving a broadcast signal that contains a main image and a sub-image, setting a restriction area where motion estimation is restricted in the sub-image, performing motion estimation in areas corresponding to the broadcast signal other than the set restriction area, and displaying the broadcast signal obtained after the motion estimation is performed.

12 Claims, 4 Drawing Sheets

DISPLAY APPARATUS PERFORMING CORRECTION OF DATA CORRUPTION AND METHOD THEREOF

CROSS-REFERENCE TO RELATED PATENT APPLICATION

This application claims priority from Korean Patent Application No. 10-2008-0114681, filed on Nov. 18, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to a display method and apparatus, and more particularly, to a display method and apparatus which correct data corruption due to a difference in a degree of motion in a main image and in a sub-image of a broadcast signal.

2. Description of the Related Art

When a television (TV) receives a broadcast signal at approximately 50 Hz or 60 Hz, the received broadcast signal is processed by a scaler and a picture enhancement (PE) unit, and the processed broadcast signal is transmitted to a motion judder cancellation (MJC)/frame rate conversion (FRC) unit, so as to be displayed with an increased number of frames at 120 Hz per second.

The MJC/FRC unit estimates the trace of a moving object and generates a new image based on the estimated trace of the object using motion estimation (ME) and motion compensation (MC) technologies, so that the new image may be displayed without any delay.

Additionally, when a main image is received together with a sub-image, for example when the news is shown as a main image and material related to the news is shown as a sub-image, a current TV system does not distinguish between the main image and the sub-image during motion estimation.

As a result, data in an edge of the sub-image is corrupted due to a difference in the degree of motion in the main image and in the sub-image. In other words, the ME and MC technologies are not fully performed in the edge of the sub-image where the largest difference in the degree of motion is found, which is a side effect caused by operations of the MJC/FRC unit. Therefore, a degradation of the image quality occurs as a result of data corruption.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display method and an apparatus which receives information regarding an area corresponding to a sub-image contained in a broadcast signal and bypasses an operation for estimating motion of the area in order to solve data corruption due to a difference in a degree of motion in the main image and the sub-image contained in the broadcast signal.

According to an aspect of the present invention, there is provided a display method including receiving a broadcast signal which includes a main image and a sub-image, setting a restriction area where motion estimation is restricted in response to a request for restriction of the motion estimation, performing motion estimation in areas of the broadcast signal other than the area set as the restriction area, and displaying the broadcast signal obtained after the motion estimation.

The restriction area may be either an area corresponding to the entire sub-image or a boundary area between the sub-image and the main image.

The setting of the restriction area may include providing a user interface (UI) if a request for restriction of motion estimation is received, determining an area corresponding to the sub-image based on area information received by the UI, and setting the restriction area based on the area information which corresponds to the area of the sub-image.

The providing the UI may includes displaying an area setting window to determine the area corresponding to the sub-image, and receiving the area information according to an adjustment of the area setting window by the user.

The area information may include a size or a position of the area setting window.

The area information may further include information regarding a display size or display position of the sub-image.

The request for restriction of motion estimation may be generated according to preset display options or may be actuated by a user.

According to another aspect of the present invention, there is provided a display apparatus comprising a tuner which receives a broadcast signal comprising a main image and a sub-image; a controller which sets a restriction area where motion estimation is restricted in response to a request for restriction of motion estimation; a motion estimator which performs motion estimation in areas other than the restriction area selected from a plurality of areas corresponding to the broadcast signal; and a display unit to display the broadcast signal obtained after the motion estimation.

The restriction area may be either an area corresponding to the entire sub-image or a boundary area between the sub-image and the main image.

The display apparatus may further include a user interface unit which provides a UI to set a restriction area corresponding to the area of the sub-image. If the request for restriction of motion estimation is received, the controller may control the user interface unit to provide the UI, may determine the area corresponding to the sub-image according to area information received by the UI, and may set the restriction area based on the area determined as the are corresponding to the sub-image.

The user interface unit may control the display unit to display an area setting window to determine the area corresponding to the sub-image, and may receive the area information according to user adjustment of the area setting window.

The area information may include user adjustment information required to adjust a size or position of the area setting window.

The area information may include information regarding a display size or display position of the sub-image.

The request for restriction of motion estimation may be generated according to preset display options or may be actuated by a user.

BRIEF DESCRIPTION OF THE DRAWINGS

The above and/or other aspects of the present invention will be more apparent by describing in detail exemplary embodiments thereof with reference to the attached drawings in which.

DETAILED DESCRIPTION OF EXEMPLARY EMBODIMENTS

Figure 1:
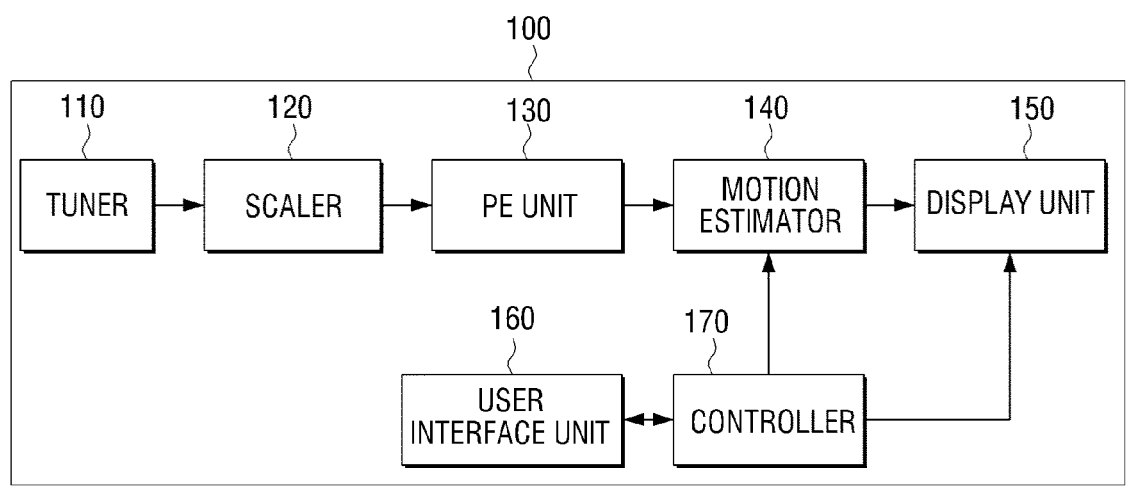
FIG. 1 is a block diagram illustrating a display apparatus according to an exemplary embodiment of the present invention.

Hereinafter, the present invention will be described in greater detail with reference to the accompanying drawings, in which exemplary embodiments of the invention are shown.

In the following description, the same reference numerals are used for the same elements when they are depicted in different drawings. The matters defined in the description, such as detailed construction and elements, are provided to assist in a comprehensive understanding of the invention. Thus, it is apparent that the exemplary embodiments of the present invention can be carried out without those specifically defined matters. Also, functions or elements known in the related art are not described in detail since they would obscure the invention with unnecessary detail.

FIG. 1 is a block diagram illustrating a display apparatus according to an exemplary embodiment of the present invention.

The display apparatus 100 of FIG. 1 comprises a tuner 110, a scaler 120, a picture enhancement (PE) unit 130, a motion estimator 140, a display unit 150, a user interface unit 160 and a controller 170.

The tuner 110 receives a broadcast signal from a broadcast transmitter (not shown) when the display apparatus 100 is powered on. The broadcast signal comprises a main image and a sub-image.

The scaler 120 adjusts the size of the broadcast signal received by the tuner 110 such that the broadcast signal is displayed on the display unit 150. The scaler 120 adjusts the length and width of the broadcast signal.

The PE unit 130 adjusts image quality related settings of the broadcast signal, of which the size has been adjusted by the scaler 120, for example colors, sharpness and contrast of the broadcast signal.

The motion estimator 140 performs motion estimation of the broadcast signal output from the PE unit 130. In more detail, the motion estimator 140 analyzes a plurality of frames of the main image and sub-image, estimates the motion of an object in the main image and sub-image, and generates new frames based on the estimated motion so that the number of frames may be increased. The motion estimator 140 employs motion estimation (ME) and motion compensation (MC) technologies in order to display the broadcast signal without any delay.

In an exemplary embodiment of the present invention, the motion estimator 140 may perform motion estimation of the entire broadcast signal, or may bypass motion estimation of a portion of the broadcast signal under the control of the controller 170 that will be described later. In other words, the motion estimator 140 may estimate motion of the main image contained in the broadcast signal, but may not estimate motion of the sub-image contained in the broadcast signal.

The display unit 150 displays the broadcast signal, which is received by the tuner 110 and processed by the scaler 120, the PE unit 130 and the motion estimator 140. Additionally, the display unit 150 displays predetermined information under the control of the controller 170 that will be described later. The display unit 150 may be a liquid crystal display (LCD) and a plasma display panel (PDP).

In the exemplary embodiment, data may be corrupted in an edge of a sub-image of an initial broadcast signal which is displayed on the display unit 150 immediately after the display apparatus 100 is powered on. It is possible that the motion estimator 140 does not estimate motion of an area corresponding to the sub-image in the broadcast signal, and the display unit 150 may display the main image in which motion is estimated by the motion estimator 140 and the sub-image in which motion is not estimated.

The user interface unit 160 supports interfacing between the display apparatus 100 and a user. In more detail, the user actuates a predetermined request signal using a function key in the display apparatus 100 or using a remote control device, and the user interface unit 160 receives the predetermined request signal from the user and provides a UI. The predetermined request signal may be a request for restriction of motion estimation.

The request for restriction of motion estimation may be, for example, a request signal for determining an area corresponding to the sub-image and for setting a restriction area corresponding to the sub-image.

The user interface unit 160 receives area information regarding the area corresponding to the sub-image. The area information may comprise, for example, user adjustment information required to adjust the size or position of an area setting window, or information regarding the display size or display position of the sub-image.

The controller 170 controls the overall operations of the display apparatus 100. In more detail, the controller 170 controls signal input and output among the tuner 110, the scaler 120, the PE unit 130, the motion estimator 140, the display unit 150 and the user interface unit 160.

The controller 170 controls the display unit 150 to display an area setting window in response to the request signal for setting the area corresponding to the sub-image received via the user interface unit 160. The setting window enables a user to determine the area corresponding to the sub-image.

Additionally, the controller 170 may determine a predetermined area corresponding to the sub-image to be a restriction area where motion estimation is restricted, and may control the motion estimator 140 to estimate motion of areas other than the restriction area, in response to the area information received via the user interface unit 160. The restriction area may be an area corresponding to the entire sub-image or a boundary area between the main image and the sub-image.

FIGS. 2A to 2D are views illustrating the use of a user interface (UI) to determine an area corresponding to the sub-image and setting a restriction area for correcting a broadcast signal in the display apparatus 100 shown in FIG. 1.

Figure 2A:
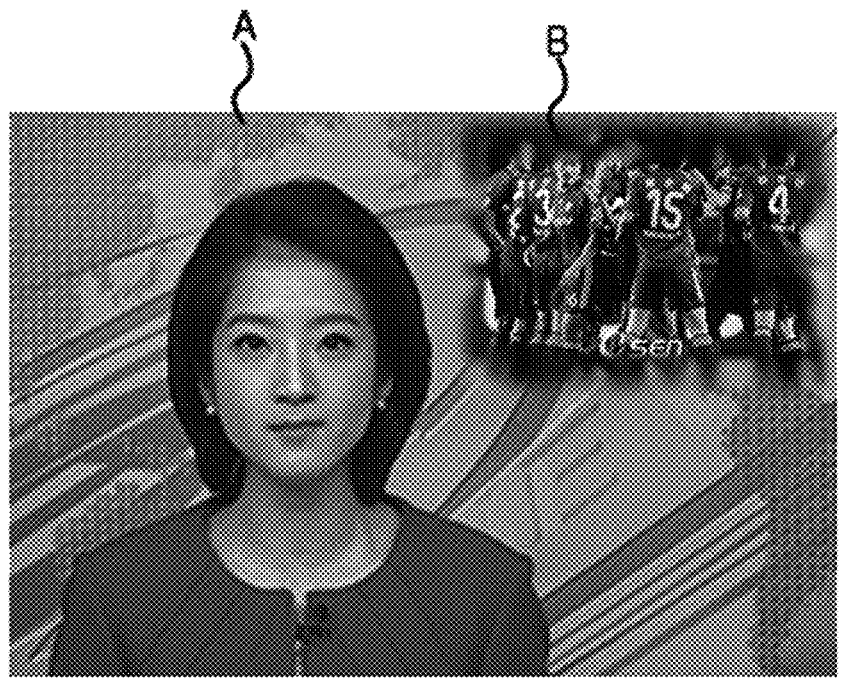
FIGS. 2A to 2D are views illustrating use of a UI to determine an area corresponding to the sub-image and setting a restriction area for correcting a broadcast signal in the display apparatus shown in FIG. 1.

As shown in FIG. 2A, the display unit 150 displays a broadcast signal. The broadcast signal contains main image A and sub-image B, and is processed by the motion estimator 140 so that motion of the broadcast signal is estimated without distinguishing the main image A from the sub-image B. In this situation, since there is a difference in the degree of motion between the main image A and the sub-image B, data in an edge of sub-image B is corrupted.

Figure 2B:
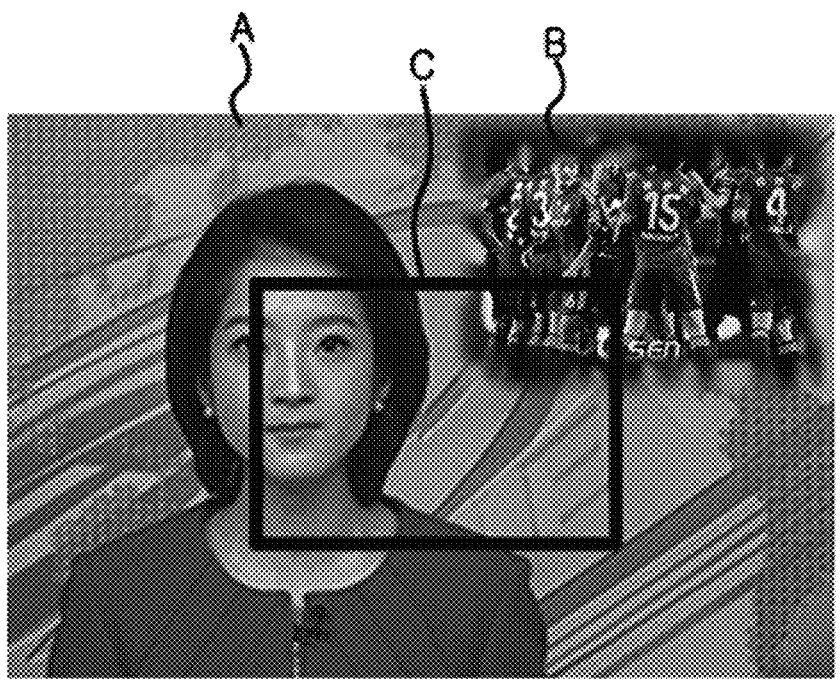

When data is corrupted in the edge of sub-image B, as shown in FIG. 2A, a user actuates an area setting request signal using a function key on the display apparatus 100 or by using a remote control device. Accordingly, the display unit 150 displays an area setting window C, as shown in FIG. 2B, which enables a user to determine a area in the broadcast signal.

Subsequently, the user adjusts the position and size of the area setting window C using the function key or using direction keys (not shown) of the remote control device, and determines the display size and display position of sub-image B.

Figure 2C:
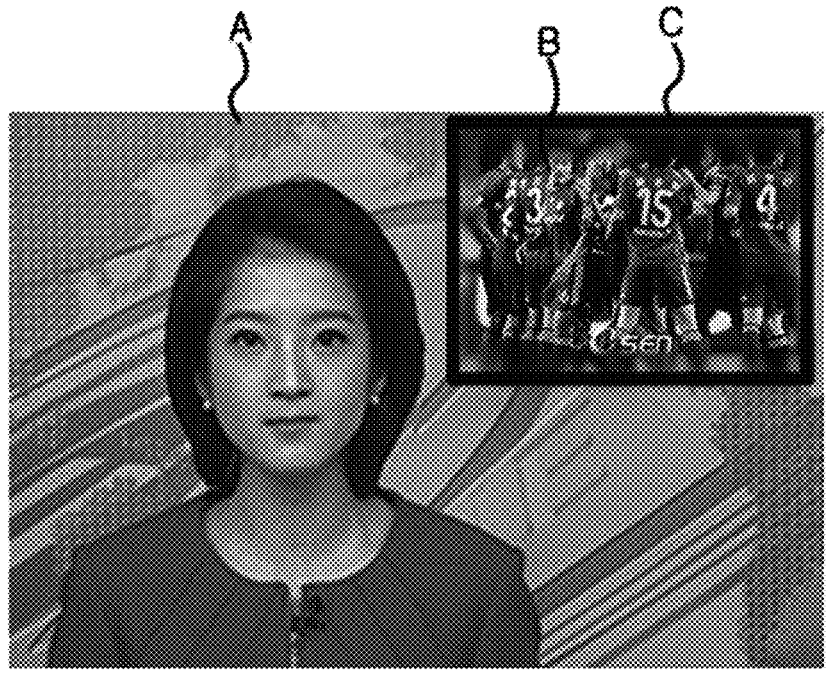

As shown in FIG. 2C, the position and size of the area setting window C is set to be coincident with the display size and display position of sub-image B.

The controller 170 controls determining an area corresponding to sub-image B based on the received area information, and setting an area to be a restriction area where motion estimation is restricted. After receiving the area information comprising the display size and display position of sub-image B from the user, the controller 170 controls the motion estimator 140 to estimate motion of areas other than an area specified by the received area information.

Accordingly, the motion estimator 140 estimates the motion of main image A, but does not estimate the motion of sub-image B.

Figure 2D:
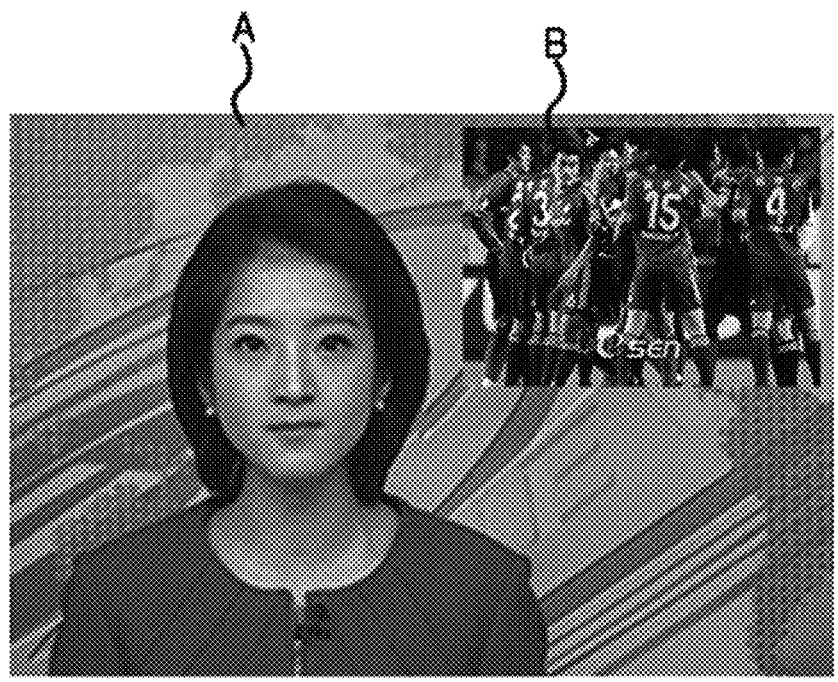

Therefore, it is possible to correct data corruption shown in FIG. 2A and display main image A and sub-image B without data corruption, as shown in FIG. 2D.

In the exemplary embodiment, the controller 170 controls determining an area on which sub-image B is displayed to be a restriction area where motion estimation is restricted.

However, the present invention is also applicable to a situation in which a boundary area between main image A and sub-image B is determined to be a restriction area. For example, the controller 170 may control determining an edge area of sub-image B with a predetermined display ratio to be a restriction area.

Additionally, while the user actuates the request signal for restriction of motion estimation of sub-image B using the user interface unit 160 in the exemplary embodiment, the present invention is not limited thereto. Accordingly, the present invention is also applicable to a situation in which a request signal for restriction of motion estimation is automatically generated by the controller according to display options previously set in the display apparatus 100.

The process for correcting a broadcast signal in the display apparatus 100 is now described with reference to FIGS. 1 to 3.

Figure 3:
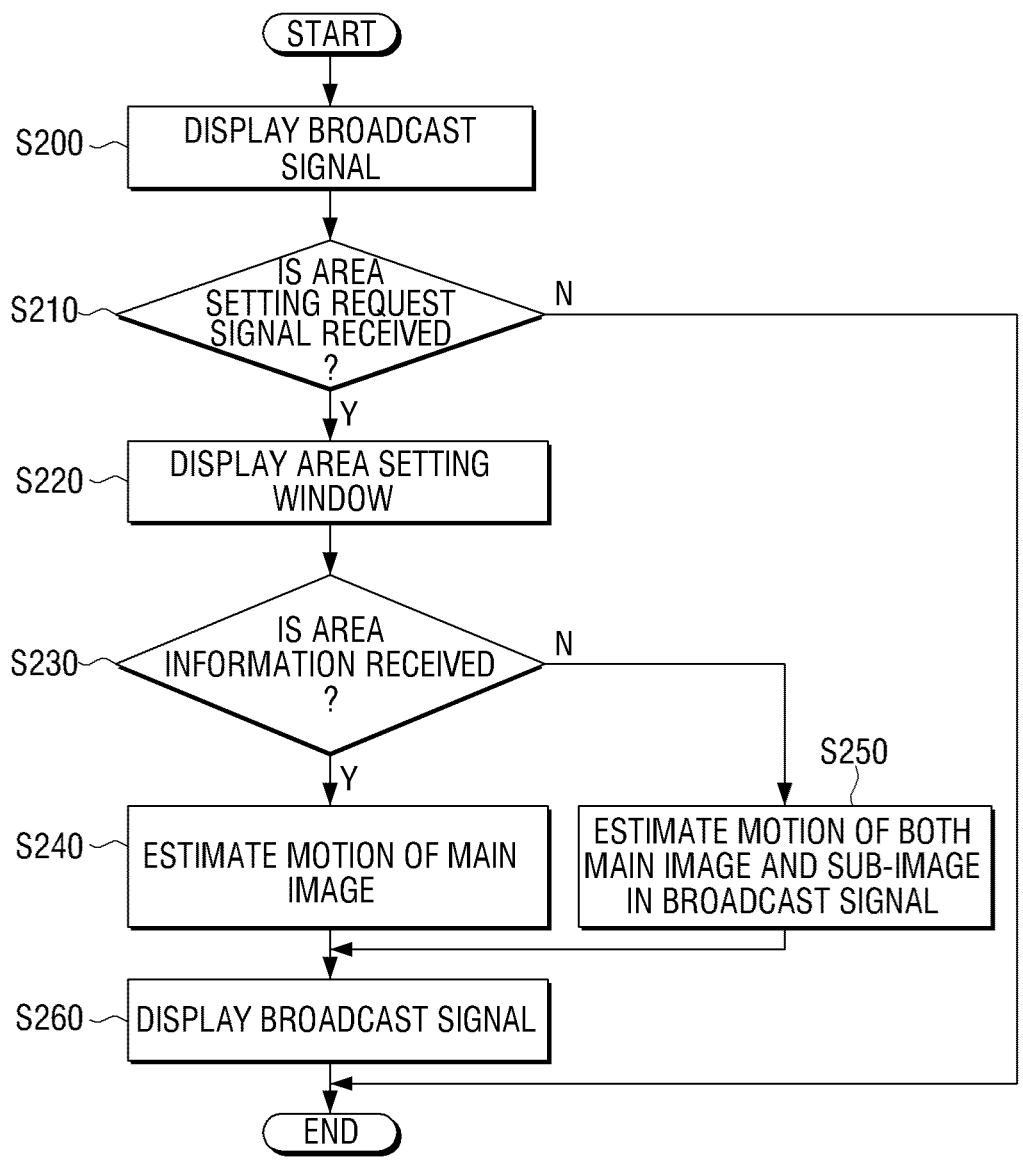
FIG. 3 is a flowchart of a display method according to an exemplary embodiment of the present invention.

FIG. 3 is a flowchart describing a display method according to an exemplary embodiment of the present invention.

When the tuner 110 receives the broadcast signal, the scaler 120, the PE unit 130 and the motion estimator 140 process the received broadcast signal, and the display unit 150 displays the processed broadcast signal (S200).

If data is corrupted in sub-image B, contained in the broadcast signal output from the display unit 150, the user actuates the area setting request signal for sub-image B in order to correct the data corruption (S210). After receiving the area setting request signal via the user interface unit 160 (S210-Y), the controller 170 controls the display unit 150 to display area setting window C (S220). Alternatively, if an area setting request signal is not received (S210 N) the controller terminates the process for correcting a broadcast signal.

Subsequently, the user adjusts the size and position of area setting window C, and enters the area information comprising information regarding the display size and display position of sub-image B.

If the area information is received via the user interface unit 160 (S230-Y), the controller 170 controls the motion estimator 140 to estimate motion of images other than sub-images among following broadcast signals that will be received. The motion estimator 140 estimates motion of main image A without estimating the motion of sub-image B (S240).

Alternatively, if the area information is not received (S230-N), the controller 170 controls the motion estimator 140 to perform motion estimation of the entire broadcast signal without distinguishing main image A from sub-image B (S250).

The display unit 150 displays the broadcast signal in which motion of main image A only is estimated, or the broadcast signal in which motion of both main image A and sub-image B is estimated (S260).

When the display apparatus 100 displays the broadcast signal containing main image A and sub-image B, the user may check whether data is corrupted in sub-image B, and may request the display apparatus 100 to correct sub-image B.

In response to the user request, the display apparatus 100 may perform motion estimation of main image A only, and it is thus possible to correct data corruption which is due to a difference in the degree of motion in main image A and sub-image B, thereby providing the user with a high quality broadcast signal.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display method comprising:
  receiving a broadcast signal comprising a main image and a sub-image;
  receiving area information defining an area corresponding to the sub-image together with the broadcast signal;
  setting a restriction area where motion estimation is restricted in the sub-image based on the area information;
  performing motion estimation in areas corresponding to the broadcast signal other than the set restriction area; and
  displaying the broadcast signal obtained after the motion estimation,
  wherein the setting comprises:
    providing a user interface (UI) to determine the area corresponding to the sub-image if a request for restriction of motion estimation is received;
    determining the area corresponding to the sub-image according to area information received by the UI; and
    setting the restriction area based on the area corresponding to the sub-image.

2. The display method as claimed in claim 1, wherein the restriction area is an area corresponding to the entire sub-image or an area corresponding to a boundary area between the sub-image and the main image.

3. The display method as claimed in claim 1, wherein the providing the UI comprises:
  displaying an area setting window to determine the area corresponding to the sub-image; and
  receiving the area information according to an adjustment of the area setting window.

4. The display method as claimed in claim 3, wherein the area information comprises adjustment information for adjusting a size or a position of the area setting window.

5. The display method as claimed in claim 1, wherein the area information comprises information regarding a display size or a display position of the sub-image.

6. The display method as claimed in claim 1, wherein the setting the restriction are is performed in response to a request for restriction of motion estimation which is automatically generated according to preset display options or is input by a user.

7. A display apparatus comprising:
a tuner which receives a broadcast signal comprising a main image and a sub-image;
a controller which receives area information defining an area corresponding to the sub-image together with the broadcast signal and sets a restriction area where motion estimation is restricted in the sub-image based on the area information;
a motion estimator which performs motion estimation in areas corresponding to the broadcast signal other than the restriction area;
a display unit which displays the broadcast signal obtained after the motion estimation is performed by the motion estimator, and
a user interface unit which provides a user interface (UI) to set the area corresponding to the sub-image,
wherein, if a request for restriction of motion estimation is received, the controller controls the user interface unit to provide the UI, determines the area corresponding to the sub-image according to area information received by the UI, and sets the restriction area based on the area corresponding to the sub-image.

8. The display apparatus as claimed in claim 7, wherein the restriction area is an area corresponding to the entire sub-image or an area corresponding to a boundary area between the sub-image and the main image.

9. The display apparatus as claimed in claim 7, wherein the user interface unit controls the display unit to display an area setting window to determine the area corresponding to the sub-image, and receives the area information according to an adjustment of the area setting window.

10. The display apparatus as claimed in claim 9, wherein the area information comprises adjustment information for adjusting a size or position of the area setting window.

11. The display apparatus as claimed in claim 9, wherein the area information comprises information regarding a display size or a display position of the sub-image.

12. The display apparatus as claimed in claim 7, wherein the controller sets the restriction area in response to a request for restriction of motion estimation which is automatically generated according to preset display options or is input by a user.

* * * * *